United States Patent Office 3,394,699
Patented July 30, 1968

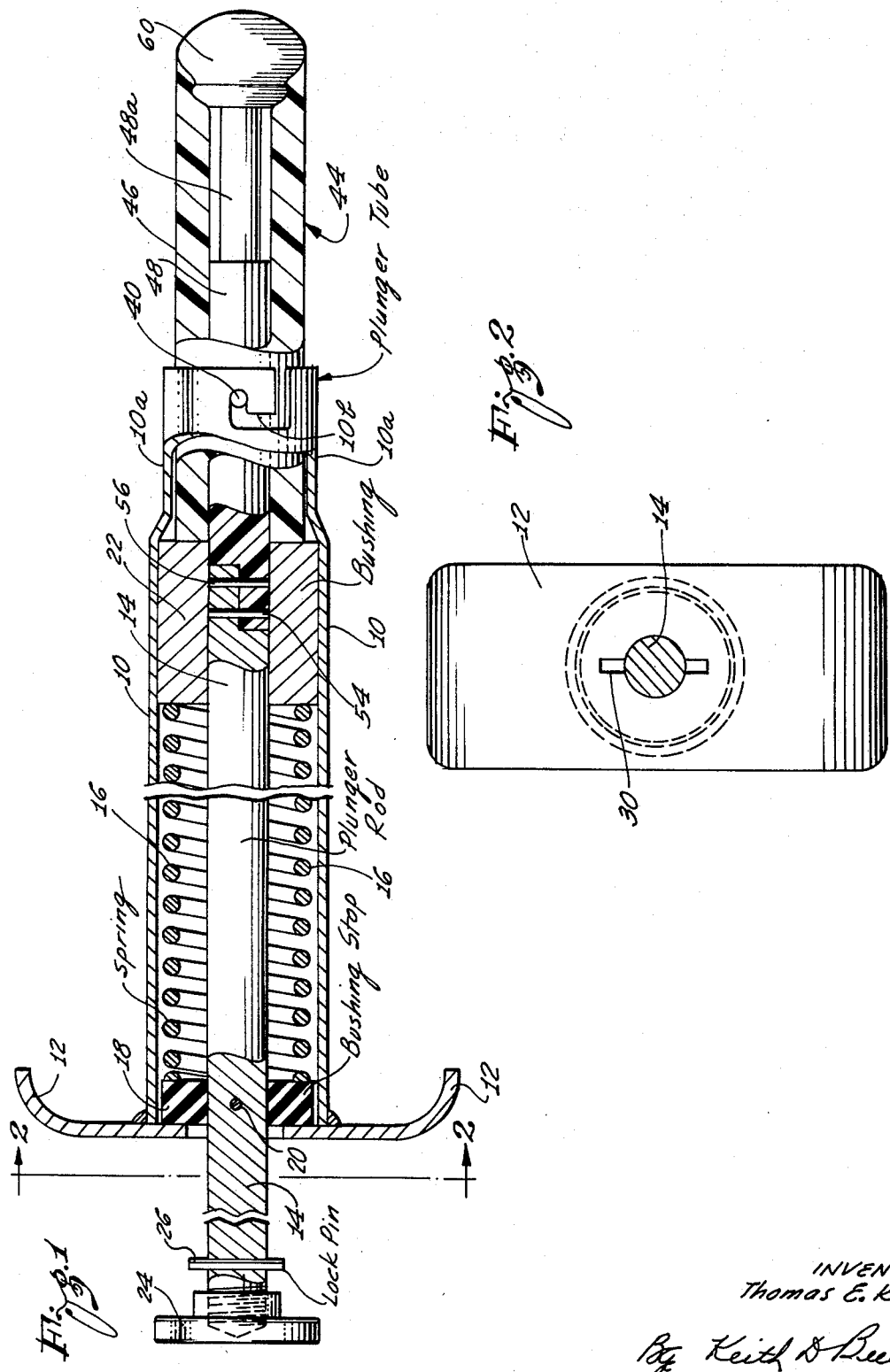

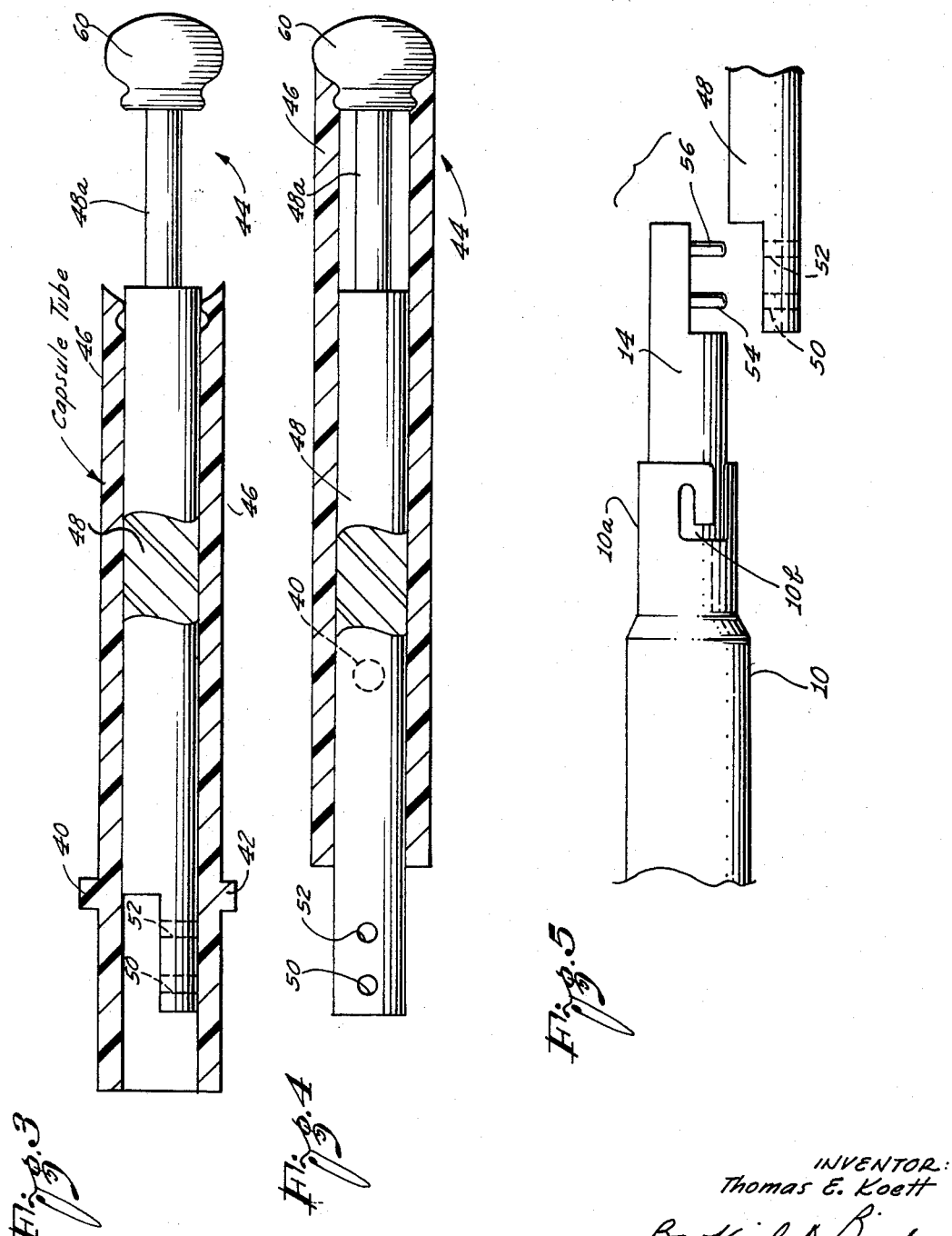

3,394,699
INSTRUMENT FOR OBTAINING A BIOPSY SPECIMEN
Thomas E. Koett, Granada Hills, Calif., assignor to Panto Enterprises, Inc., Sepulveda, Calif., a corporation of California
Filed July 22, 1965, Ser. No. 473,954
6 Claims. (Cl. 128—2)

ABSTRACT OF THE DISCLOSURE

An improved instrument for obtaining a biopsy specimen of, for example, a uterine infection. The instrument includes a detachable sealed capsule at one end, which is opened only after the instrument has been inserted into the uterus. The capsule is then closed and again sealed while still in the uterus, and before the instrument is withdrawn from the uterus. In this manner, the instrument may obtain a specimen from the uterus, and may withdraw the specimen without contamination of the specimen.

---

The present invention relates to an improved instrument for obtaining an uncontaminated specimen of uterine infections, or of infections of other internal organs; and the invention finds utility for use both with animals or humans.

Extreme difficulties have been encountered in the past when it was attempted to obtain a specimen from the uterus of a cow or mare, for example, which could be used as a culture in the laboratory to determine whether an infection existed. The reason for the difficulties is that the specimens tend to become contaminated from contact with other internal organs and other internal areas of the animal as they are being withdrawn.

The reason for such contamination is that, in order to obtain the required culture specimen, it is necessary to enter the uterus through the vaginal tract and cervix; then the specimen must be withdrawn through the same passages. It is obvious that unless a special type of instrument is used, contamination of the specimen will result.

An object of the present invention is to provide an improved instrument which may be inserted into the uterus, or other internal organ, of an animal, or human, so as to obtain a specimen from the wall of the uterus, or other organ, and to remove the specimen without any contamination thereof.

The above objective is achieved, in a manner to be described, by the provision of a sealed, detachable capsule at the inner end of the instrument. The capsule is opened only after the instrument has been inserted into the uterus, so as to enable the specimen to be obtained. The capsule is then closed and sealed while still in the uterus, before the instrument is withdrawn from the uterus.

The capsule itself may be distributed in a sterile condition, for example, in a plastic bag. To mount the capsule on the instrument, the doctor may merely tear off a corner of the bag and fit the capsule without actually touching it. He can wear sterile gloves at the time, so that there will be no contamination problems either to the animal or to the doctor. The capsule itself, as mentioned above, is closed and sealed until it is in position to obtain the specimen. Absorbent cotton or felt may be positioned in the capsule, and this material is wiped along the walls of the uterus when the capsule is opened to obtain the specimen.

If so desired, the capsule can be shaped to perform a biopsy. This can be achieved by providing a cutting edge on the capsule which serves to shear off a piece of the uterus wall itself when the instrument is actuated, with the sheared piece of tissue being encased into the sealed capsule, so as to be free from contamination as the instrument is withdrawn from the animal.

A feature of the invention, therefore, is the provision of a separate detachable "throw-away" capsule which may be removably mounted on the inner end of the instrument, and in which the specimen obtained from the wall of the uterus is enclosed and sealed.

After use, the capsule can be detached from the instrument and sent to the laboratory, so that the specimen can be placed in a culture growing solution. The used capsule can then be discarded.

It will be appreciated that in the past, whenever an attempt was made to obtain a specimen from the uterus of an animal, for example, a separate instrument had to be used for each separate animal, and the instruments themselves had to be taken to the laboratory at which the specimens were to be used.

A feature of the present inevntion is that the provision of the detachable capsule enables a whole herd of cattle, for example, to be examined conveniently, by a single instrument. For each animal, a separate sterile capsule is used. The instrument itself can be sterilized between each operation, this being achieved, for example, by dipping it into an antiseptic solution. As each animal is examined, its particular capsule can be labeled. Then, at the end of all the operations, the capsules can be all taken to the laboratory.

In the embodiment of the invention to be described, and as mentioned above, a quantity of absorbent cotton, or felt, is previously inserted into each capsule. This cotton, or felt, is wrapped around a rod in the capsule, and is wiped along the wall of the uterus in order to obtain the specimen.

As mentioned above, and as will become more evident as the description proceeds, the instrument can be modified slightly so as to permit a biopsy to be obtained. The tissue obtained by the biopsy is likewise sealed into the capsule after it has been obtained, so as to permit it to be removed from the animal without any possibility of contamination from the walls of other organs or tracts.

The aforesaid detachable capsule itself may be composed of a suitable heat-resistant plastic material, such as nylon. When such material is used, the capsule can be sterilized at high temperatures without adversely affecting the shape or composition of the material itself.

The instrument of the invention, in the embodiment to be described, has an elongated tubular configuration, and it includes a spring-loaded internal rod. The rod is slidably mounted in the tubular portion and protrudes from one end of the tubular portion. This permits the doctor to push the rod into the tubular portion, against the spring bias, when the instrument is inserted into the uterus, and in order to open the capsule and obtain the specimen. Then, when pressure is removed from the rod, the spring bias returns it to its normal position, so as to close the capsule. The instrument can then be removed from the uterus without fear of contamination of the specimen.

The aforesaid tubular member and rod, as well as the internal spring, making up the instrument of the invention can be composed of stainless steel, for example, or other appropriate surgical material.

The features of the invention which are believed to be new are set forth with particularity in the claims. The invention itself, however, together with further objects and advantages may best be understood by reference to the following specification when read in conjunction with the accompanying drawings, in which:

FIGURE 1 is a side view, partially in section, showing the improved instrument of the present invention, together with a detachable capsule mounted at one end;

FIGURE 2 is a sectional view of the instrument, taken essentially along the line 2—2 of FIGURE 1, and showing a locking means for the instrument, whose purpose will be described;

FIGURE 3 is a side view, partially in section, and on an enlarged scale with respect to FIGURE 1, of a detachable capsule for use in conjunction with the instrument of FIGURE 1;

FIGURE 4 is a view like FIGURE 3, but with the capsule rotated 90° about its longitudinal axis; and FIGURE 5 is a fragmentary schematic view showing the manner in which the capsule is mounted on the instrument itself.

As shown in FIGURE 1, for example, the instrument of the invention includes an elongated tubular member 10 which may be composed, for example, of stainless steel. A bracket 12 is mounted at the left-hand end of the tubular member 10 in FIGURE 1. The bracket provides a handle for the instrument, permitting it to be grasped by the person using the instrument.

A rod 14 is slidably mounted in the tubular member 10, and the rod is spring biased by a spring 16 to the left in FIGURE 1. The spring 16 biases the rod 14 so that it protrudes through the left-hand end of the tubular member 10, as shown in FIGURE 1.

A bushing 18 is mounted on the rod 14 by means, for example, of a pin 20. The bushing 18 serves as a stop, to limit the displacement of the rod 14 to the left in the tubular member 10. A second bushing 22 is mounted at the right-hand end of the tubular member 10 to serve as a mount for the spring 16, and also to provide a sliding passage for the right-hand end of the rod 14.

A knob 24 is mounted on the left-hand end of the rod 14. It will be appreciated that when the instrument is grasped with the fingers around the handle 12, and with the thumb engaging the knob 24, the rod 14 may be conveniently moved in the tubular member 10 against the spring bias of the spring 16 to the right in FIGURE 1.

The rod 14 is rotatable in the tubular member 10. A lock pin 26 extends radially through the rod 14 adjacent the knob 24. The rod 14 is turned in the tubular member 10 in a manner to permit the pin 26 to be received in slots 30 in the handle 12. The rod 14 is then turned slightly, so that the lock pin is trapped behind the handle. This serves as a means for displacing the rod 14 into the tubular member 10 against the spring bias of the spring 16, and locking it in position with its right-hand end protruding from the end of the tubular member 10, as best shown, for example, in FIGURE 5.

The right-hand end of the tubular member 10 has a reduced section 10a which is equipped with a bayonet type receptacle slot 10b. This slot, and a similar slot diametrically opposite to the slot 10b, receives a pair of projections 40 and 42 of a detachable capsule 44.

The capsule 44, as explained above, is composed of a heat resistant plastic material, such as nylon, for example. The capsule includes an outer tubular housing 46 which is keyed to the tubular member 10 by the projections 40 and 42 in the manner described above.

The capsule also includes an inner rod 48 which is slidable in the housing 46. The rod 48 has a pair of apertures 50, 52 which respectively receive a pair of corresponding pins 54 and 56 extending out from the extremity of the rod 14.

It will be observed in FIGURES 1 and 5 that the right hand extremity of the rod 14 is undercut, as is the left-hand extremity of the capsule rod 48, so that the two rods may mate together, as shown, with the pins 54 and 56 serving to couple the two rods together.

As is shown in FIGURES 4 and 5, for example, the capsule rod 48 has a knob 60 at its end. The knob 60 is rounded to facilitate its entry through the cervix and into the uterus. The knob 60 is also shaped so that it will partially enter the housing 46, in sealed engagement with the housing. The end of the rod 48 adjacent the knob 60 has a reduced diameter to form a portion 48a. The piece of absorbent material, such as cotton or felt, is wrapped around the portion 48a under sterile conditions in the laboratory during assembly of the capsule.

As mentioned above, the capsule is preferably formed of a plastic material, and the knob 60 is shaped to enter into a close double sealing relationship with the end of the housing 46, when the capsule is in its closed condition (as shown in FIGURES 3 and 4).

The configuration of the end of the housing is made such to provide a tight fit with the knob 60, and it requires, for example, one to two pounds pressure to engage or disengage the resulting seal between the knob 60 and the end of the housing.

When the rod 14 is pushed into the tubular member 10, the capsule rod 48 is moved with respect to the housing 46, so that the knob 60 breaks its seal with the end of the housing and it, together with the portion 48a, is caused to extend out of the housing. This exposes the absorbent material on the portion 48a to the wall of the uterus, enabling the specimen to be taken. Then, when the pressure is released from the rod 14, the spring 26 returns the rod to the position shown in FIGURE 1, causing the rod 48 to move back into the capsule housing 46, with the knob 60 again sealing the end of the capsule.

As mentioned above, the capsule itself may be supplied in a sterile bag, and it can be attached to the tube without touching the capsule with the finger by only partially removing it from the bag. The capsule is mounted on the instrument in the manner shown, for example, in FIGURE 5, and as described briefly above.

After the capsule rod 48 is coupled to the rod 14 by means of the pins 54 and 56, and as shown in FIGURE 5, the rod 14 is released from the slots 30, by rotating it until the lock pin 26 is again aligned with the slots. The rod 14 then is withdrawn back into the tubular member 10, moving the capsule 44 in with it. The capsule 44 is turned with the rod 14, until it has the proper orientation so that its projecting portions 40 and 42 are received in the bayonet slots. The capsule and rod are then turned back, so that the capsule may be locked into the bayonet slots in the position shown, for example, in FIGURE 1.

A flexible plastic shipping cap may be provided. This shipping cap may be slipped over the capsule when it is not on the instrument, and before and after use. This cap assures that the capsule will not be inadvertently opened when it is not on the instrument.

The invention provides, therefore, an improved instrument for obtaining specimens of uterine infections, and the like. As mentioned above, the instrument is suitable for use with animals or humans, and in any application in which an uncontaminated specimen from an internal organ is required.

While a particular embodiment of the invention has been shown and described, modifications may be made. It is intended in the following claims to cover all modifications which fall within the scope of the invention.

What is claimed is:

1. An instrument for obtaining a specimen from an internal organ, such as the uterus, or the like, including: an elongated tubular member; a rod slidably mounted in said tubular member for relative longitudinal movement with respect thereto; and a capsule including a tubular outer member detachably mounted to the end of said first mentioned tubular member, and further including an internal rod-like member detachably coupled to the end of said first mentioned rod, said internal rod-like member of said capsule having an end portion of reduced diameter, and a knob-like member mounted on the end of said rod-like member, said rod-like member of said capsule being movable within said tubular outer member of said capsule from a closed sealed position in which said knob-like member engages the end of said tubular outer member and in which said reduced diameter portion of said rod-like member is enclosed in said tubular outer member, to an open position in which said knob-like member is displaced from the end of said tubular outer member and in which said reduced diameter portion of said rod-like member protrudes through the end of said tubular outer member as said first-mentioned rod is moved longitudinally with respect to said first-mentioned tubular member.

2. The instrument defined in claim 1 in which said first-mentioned rod is spring loaded so as to maintain said capsule normally in its closed sealed position.

3. The instrument defined in claim 1 in which said capsule is composed of a heat-resistant plastic material.

4. The instrument defined in claim 2 and which includes a handle mounted on the other end of said first-named tubular member to be grasped by the fingers of one hand of the operator, and in which said first-named rod protrudes beyond said other end of said first-named tubular member, and a push-knob mounted on the protruding end of said rod to be pushed by the thumb of the aforesaid hand of the operator.

5. The instrument defined in claim 4 and which includes a radial lock pin extending through said rod adjacent said push knob, and in which said handle defines a slot to receive said lock pin for a particular angular orientation of said first-named rod relative to said first-named tubular member when said first-mentioned rod is moved longitudinally into said first-mentioned tubular member.

6. The instrument defined in claim 1 in which said end of said first-named tubular member and the adjacent end of said tubular outer member of said capsule define a bayonet plug and receptacle for detachably mounting said capsule on said first-named tubular member.

References Cited

UNITED STATES PATENTS

| | | | |
|---|---|---|---|
| 2,505,358 | 4/1950 | Gusberg et al. | 128—2 |
| 2,749,909 | 6/1956 | Ullery et al. | 128—2 |
| 2,767,703 | 10/1956 | Nieburgs | 128—2 |
| 2,790,437 | 4/1957 | Moore | 128—2 |
| 2,856,933 | 10/1958 | Hildebrand | 128—307 |
| 3,037,495 | 6/1962 | Naz | 128—2 |
| 3,037,496 | 6/1962 | Melges | 128—2 |
| 3,074,396 | 1/1963 | MacLean | 128—2 |
| 3,086,527 | 4/1963 | Forrest | 128—2 |

FOREIGN PATENTS

| | | |
|---|---|---|
| 1,311,292 | 10/1962 | France. |
| 1,160,573 | 1/1964 | Germany. |

RICHARD A. GAUDET, *Primary Examiner.*

K. L. HOWELL, *Assistant Examiner.*